United States Patent [19]
Iida et al.

[11] Patent Number: 5,271,913
[45] Date of Patent: Dec. 21, 1993

[54] DENITRATION CATALYST FOR HIGH-TEMPERATURE EXHAUST GAS

[75] Inventors: Kouza Iida; Yoshiaki Obayashi, both of Kanonshin; Satoru Serizawa, Akunoura, all of Japan

[73] Assignee: Mitsubishi Jukogyo Kabushiki Kaisha, Tokyo, Japan

[21] Appl. No.: 961,116

[22] Filed: Oct. 14, 1992

Related U.S. Application Data

[63] Continuation of Ser. No. 635,255, Dec. 28, 1990, abandoned.

Foreign Application Priority Data

Dec. 28, 1989 [JP] Japan .................................. 1-338733
Apr. 13, 1990 [JP] Japan .................................. 2-96265

[51] Int. Cl.$^5$ .............................................. B01D 53/34
[52] U.S. Cl. ................................ 423/213.2; 423/213.5; 423/239.2
[58] Field of Search ............. 423/213.2, 213.5, 239 A, 423/239 Z; 502/65, 73

[56] References Cited

U.S. PATENT DOCUMENTS 4,157,375  6/1979  Brown et al. .................... 423/239 Z
5,149,512  9/1992  Li et al. ........................... 423/239 X

FOREIGN PATENT DOCUMENTS 3805734   8/1989  Fed. Rep. of Germany ... 423/213.2
51-69476  6/1976  Japan ............................... 423/239 A
140628    8/1982  Japan ............................... 423/239 Z
3-270733  12/1991 Japan ...................................... 502/65

Primary Examiner—Carl F. Dees
Attorney, Agent, or Firm—McAulay Fisher Nissen Goldberg & Kiel

[57] ABSTRACT

A denitration catalyst for a high-temperature exhaust gas which is used to catalytically reduce and remove nitrogen oxides in the reaction temperature range of from 500° to 700° C. in the process of adding an ammonia gas to the exhaust gas containing the nitrogen oxides, the aforesaid catalyst being characterized by carrying 0.5 to 10% by weight of cerium in terms of $Ce_2O_3$ or 0.5 to 5% by weight of iron in terms of $Fe_2O_3$ on a high silica type zeolite in which the molar ratio of $SiO_2/Al_2O_3$ is 20 or more.

9 Claims, 1 Drawing Sheet

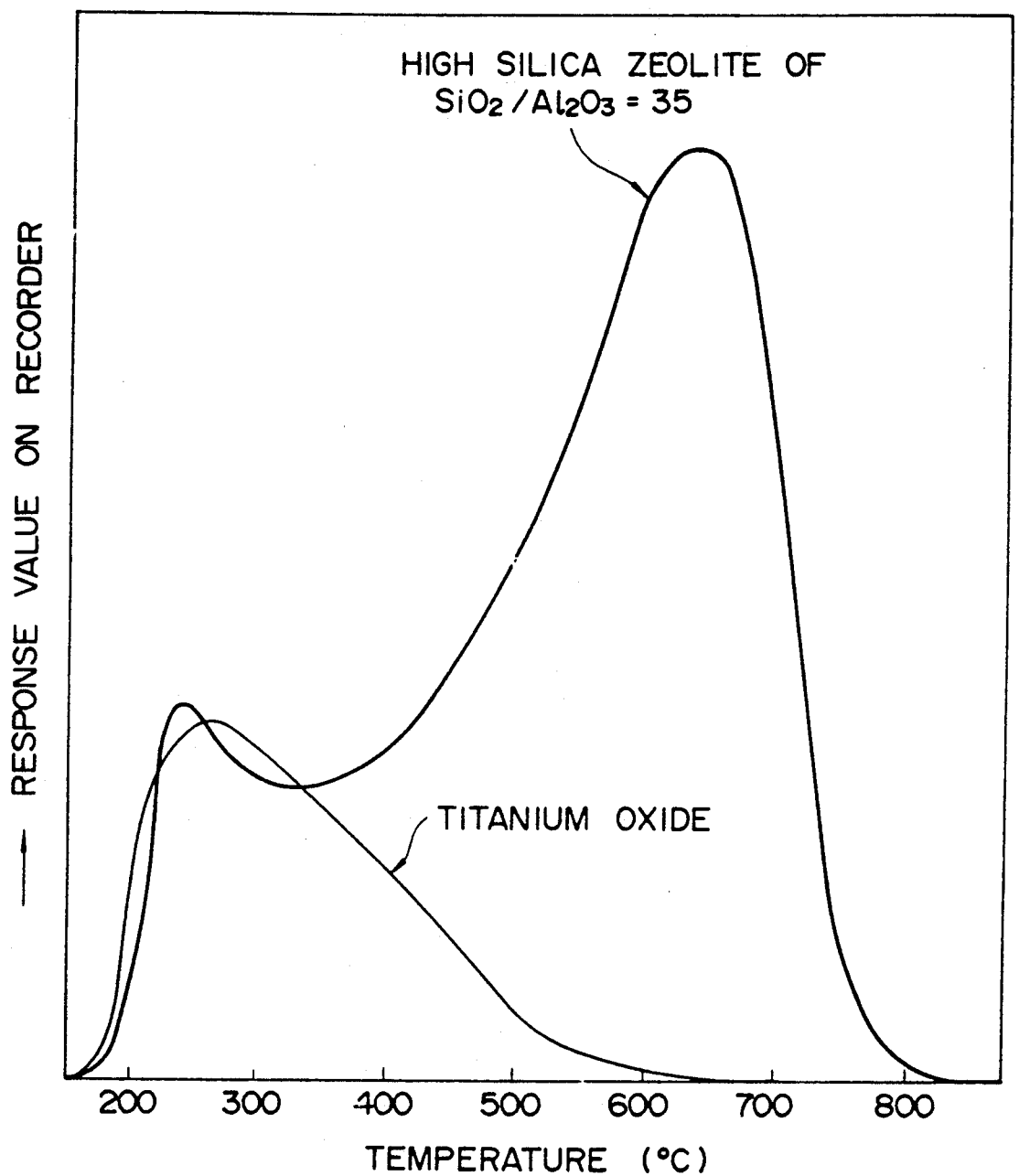

DENITRATION CATALYST FOR HIGH-TEMPERATURE EXHAUST GAS

This is a continuation of application Ser. No. 07/635,255, filed Dec. 28, 1990, and now abandoned.

FIELD OF THE INVENTION AND RELATED ART STATEMENT

The present invention relates to a catalyst for reducing nitrogen oxides (hereinafter referred to as "$NO_x$") contained in a combustion exhaust gas to harmless nitrogen, and more specifically, it relates to a catalyst for reducing/decomposing $NO_x$ in an exhaust gas from a boiler or a gas turbine or a combustion exhaust gas exhausted from an industrial furnace or the like at a high temperature of 500° C. or more in the presence of ammonia.

Now, a process for removing $NO_x$ from the combustion exhaust gas is mainly a dry catalytic reduction process which comprises adding ammonia to the exhaust gas, and then converting $NO_x$ into harmless nitrogen in the presence of a catalyst. In this process, many known catalysts can be used. One example of these catalysts is composed of a main component such as titanium oxide and an active metal component such as vanadium, tungsten or molybdenum.

However, such a type of catalyst is used in the exhaust gas temperature range of from 200° to 450° C., and in treating the exhaust gas having a temperature in excess of this range, the catalyst has the drawback that it cannot always exert sufficient activity owing to oxidation, decomposition and the like of added ammonia at such a high temperature.

OBJECT AND SUMMARY OF THE INVENTION

An exhaust gas from a gas turbine or a glass melting furnace usually has a temperature of 500° C. or more. It is believed that the exhaust gas from the gas turbine usually has a temperature of from 500° to 600° C. and the exhaust gas from the glass melting furnace has a temperature of from 450° to 650° C.

Therefore, when such a nigh-temperature exhaust gas is treated by the use of the above-mentioned conventional catalyst, it is necessary to lower the temperature of the exhaust gas by means of a heat exchanger or the like, which inconveniently makes a denitration system complicated.

In view of such situations, an object of the present invention is to provide a practical catalyst giving a high $NO_x$ removal ratio even at a high temperature of 500° C. or more by which the above-mentioned drawback can be eliminated.

The present invention is directed to a denitration catalyst for a high-temperature exhaust gas which is used to catalytically reduce and remove nitrogen oxides ($NO_x$) in the reaction temperature range of from 500° to 700° C. in the process of adding an ammonia gas to the exhaust gas containing $NO_x$, the aforesaid catalyst being characterized by carrying 0.5 to 10% by weight of cerium in terms of $Ce_2O_3$ on a high silica type zeolite in which the molar ratio of $SiO_2/Al_2O_3$ is 20 or more.

Furthermore, the present invention is also directed to a denitration catalyst for a high-temperature exhaust gas which is used to catalytically reduce and remove $NO_x$ in the reaction temperature range of from 500° to 700° C. in the process of adding an ammonia gas to the exhaust gas containing $NO_x$, the aforesaid catalyst being characterized by carrying 0.5 to 5% by weight of iron in terms of $Fe_2O_3$ on a high silica type zeolite in which the molar ratio of $SiO_2/Al_2O_3$ is 20 or more.

That is, the present invention is characterized in that the catalyst of the present invention contains the high silica type zeolite having excellent heat resistance as a carrier, though a conventional catalyst contains titanium oxide as the carrier, and in that the catalyst of the present invention carries the active component of cerium or iron on the carrier.

From the viewpoint of resistance to heat and $SO_x$, it is preferred that the above-mentioned high silica type zeolite has the crystal structure of ZSM-5 type and that the composition of the zeolite is such that the molar ratio of $SiO_2/Al_2O_3$ is 20 or more.

In case that cerium is used as the active component, it is preferred from the viewpoint of performance that the amount of cerium to be used is in the range of from 0.5 to 10% by weight in terms of $Ce_2O_3$.

Additionally, in case that iron is used as the active component, it is preferred from the viewpoint of performance that the amount of iron to be used is in the range of from 0.5 to 5% by weight in terms of $Fe_2O_3$.

The catalyst can be prepared by impregnating the high silica type zeolite carrier with the aqueous solution of a nitrate, a halide or a sulfate of cerium or iron, or effecting ion exchange, drying and then calcining the same at a temperature of from 300° to 600° C. The catalyst can be molded into grains, columns, honeycombs or the like in compliance with an intended purpose. With a view to heightening the strength of the catalyst, glass fiber or inorganic clay may be added to the catalyst.

One reason why the catalyst of the present invention can achieve the high activity at a high temperature of 500° C. or more would be attributed to the solid acidity of the high silica type zeolite, though this presumption is not always certain.

As the catalyst using the high silica type zeolite which can remove $NO_x$ from an exhaust gas in the process of adding $NH_3$ thereto, there has been suggested, for example, a catalyst in which platinum or nickel is present in a ZSM-5 type high silica type zeolite (Japanese Patent Laid-open Publication No. 62-38225). However, with regard to this kind of catalyst, data regarding gas temperatures of at most 427° C. are merely shown in examples of the publication, and effects of the catalyst at high temperatures of 500° C. and more are not referred to anywhere.

FIG. 1 attached hereto shows TPD chromatograms which have been obtained by measuring solid acidities of titanium oxide used in the conventional catalyst and the high silica type zeolite used in the catalyst of the present invention in accordance with the pyridine adsorption TPD process. The results in FIG. 1 indicate that the high silica type zeolite contains a larger amount of the acid and a larger number of strong acid points, as compared with titanium oxide. The catalytic reduction of $NO_x$ with ammonia is considered to proceed in accordance with the Redeal-Bley mechanism in which ammonia adsorbed by the catalyst is reacted with $NO_x$ in the gas. Therefore, in using the catalyst of the present invention to which the high silica type zeolite having the strong acid points seen in FIG. 1 is applied, the adsorption of ammonia onto the catalyst would be effectively performed even at a high temperature of 500° C. or more, whereby the high activity of the catalyst would be maintained.

As described above, according to the present invention, there can be provided the catalyst for rendering $NO_x$ harmless by the selective reduction with $NH_3$ even at a high temperature of from 500° to 700° C., and it is definite that the industrial effect of the catalyst is remarkable.

BRIEF DESCRIPTION OF THE DRAWINGS

FIG. 1 shows pyridine adsorption TPD chromatograms indicating solid acid characteristics of a high silica type zeolite used in the present invention and titanium oxide which is a conventional catalyst carrier.

DETAILED DESCRIPTION OF PREFERRED EMBODIMENTS

Now, the present invention will be described in detail, but the scope of the present invention should not be limited to these examples.

Preparation of Catalyst Samples 1 to 7

A high silica type zeolite having a ZSM-5 type structure in which the molar ratio of $Si_2/Al_2O_3$ was 35 was impregnated with an aqueous cerium nitrate solution, followed by drying at 100° C. Afterward, the zeolite was calcined at 600° C. for 3 hours in an electric furnace, thereby obtaining catalyst powders having cerium contents of 0.3% by weight, 0.5% by weight, 1% by weight, 3% by weight, 5% by weight, 10% by weight and 15% by weight in terms of $Ce_2O_3$, respectively. The thus obtained catalyst powders were named Sample 1, Sample 2, Sample 3, Sample 4, Sample 5, Sample 6 and Sample 7, respectively.

Preparation of Catalyst Samples 8 to 14

The same procedure as in the preparation of the above-mentioned samples was effected except for the employment of a high silica type zeolite having a ZSM-5 type structure in which a molar ratio of $Si_2/Al_2O_3$ was 25, in order to obtain catalyst powders having cerium contents of 0.3% by weight, 0.5% by weight, 1% by weight, 3% by weight, 5% by weight, 10% by weight and 15% by weight in terms of $Ce_2O_3$, respectively. The thus obtained catalyst powders were named Sample 8, Sample 9, Sample 10, Sample 11, Sample 12, Sample 13 and Sample 14, respectively.

EXPERIMENTAL EXAMPLE 1

For the obtained catalyst powders (Samples 1 to 14), denitration performance was inspected under the following conditions:

| Temperature of gas: | 500° C., 550° C. |
|---|---|
| Amount of catalyst: | 10 mg |
| Amount of gas: | 100 Ncc/minute |
| Composition of gas: | |
| NO | 500 ppm |
| $NH_3$ | 500 ppm |
| $O_2$ | 5% |
| balance | He |

As a comparative example, a conventional $TiO_2$-$WO_3$ (8% by weight) powder (Sample 15) was also inspected in like manner. The results are set forth in Table 1.

It is apparent from the results in Table 1 that the catalysts (Samples 2 to 6 and 9 to 13) containing 0.5 to 10% by weight of cerium (in terms of $Ce_2O_3$) are more excellent in performance particularly at 550° C., as compared with the conventional catalyst (Sample 15) of the comparative example. However, when the content of cerium is in excess of 10% by weight (in terms of $Ce_2O_3$) (Samples 7 and 14), the improvement effect of the performance can scarcely be observed any more.

TABLE 1

| Catalyst | Denitration Ratio (%) | |
|---|---|---|
| | 500° C. | 550° C. |
| Sample 1 | 75 | 80 |
| Sample 2 | 82 | 85 |
| Sample 3 | 89 | 92 |
| Sample 4 | 95 | 96 |
| Sample 5 | 96 | 97 |
| Sample 6 | 96 | 97 |
| Sample 7 | 96 | 95 |
| Sample 8 | 73 | 78 |
| Sample 9 | 77 | 81 |
| Sample 10 | 83 | 89 |
| Sample 11 | 86 | 92 |
| Sample 12 | 88 | 93 |
| Sample 13 | 90 | 95 |
| Sample 14 | 90 | 94 |
| Sample 15 | 85 | 79 |

PREPARATION OF CATALYST SAMPLES 16 TO 21

A high silica type zeolite having a ZSM-5 type structure in which the molar ratio of $Si_2/Al_2O_3$ was 35 was impregnated with an aqueous ferric nitrate solution, followed by drying at 100° C. Afterward, the zeolite was calcined at 600° C. for 3 hours in an electric furnace, thereby obtaining catalyst powders having iron contents of 0.3% by weight, 0.5% by weight, 1% by weight, 3% by weight, 5% by weight and 10% by weight n terms of $Fe_2O_3$, respectively. The thus obtained catalyst powders were named Samples 16 to 21, respectively.

EXPERIMENTAL EXAMPLE 2

For the obtained catalyst powders (Samples 16 to 21) and a $TiO_2$-$WO_3$ (8% by weight) powder (Sample 22) of a comparative example, denitration performance was inspected under the following conditions, and the results are set forth in Table 2.

It is apparent from the results in Table 2 that the catalysts (Samples 17 to 20) containing 0.5 to 5% by weight of iron (in terms of $Fe_2O_3$) are more excellent in performance at both temperatures of 500° C. and 550° C., as compared with the conventional catalyst (Sample 22) of the comparative example.

However, when the content of iron is in excess of 5% by weight (Sample 21), the improvement effect of the performance can scarcely be observed any more.

Conditions for Measurement of Performance

Temperature of gas: 500° C., 550° C.
Amount of catalyst: 10 mg
Amount of gas: 100 Ncc/minute Composition of gas:

NO: 500 ppm
$NH_3$: 500 ppm
$O_2$: 5%
balance: He

TABLE 2

| Catalyst | Denitration Ratio (%) | |
|---|---|---|
| | 500° C. | 550° C. |
| Sample 16 | 75 | 79 |
| Sample 17 | 90 | 94 |

TABLE 2-continued

| Catalyst | Denitration Ratio (%) | |
|---|---|---|
| | 500° C. | 550° C. |
| Sample 18 | 94 | 97 |
| Sample 19 | 94 | 96 |
| Sample 20 | 95 | 96 |
| Sample 21 | 90 | 92 |
| Sample 22 | 85 | 79 |
| $TiO_2$—$WO_3$ powder (8% by weight) | | |

Preparation of Catalyst Sample 23

A high silica type zeolite having a ZSM-5 type structure in which the molar ratio of $SiO_2/Al_2O_3$ was 30 was impregnated with an aqueous ferric nitrate solution, followed by drying at 100° C. Afterward, the zeolite was calcined at 600° C. for 3 hours in an electric furnace, thereby obtaining a catalyst powder in the content of iron was 0.7% by weight in terms of $Fe_2O_3$. A lattice pattern honeycomb made from mullite a pitch of 4 mm and a wall thickness of 1 mm was coated with the thus obtained catalyst powder so the amount of the coated catalyst powder might be 100 grams per square meter of its apparent area, in to obtain a coated honeycomb catalyst, which was Sample 23.

Furthermore, as a comparative example, the same coating treatment as mentioned above was effected except that a conventional $TiO_2$-$WO_3$ (8% by weight) powder was used, in order to obtain a catalyst of the comparative example, which was named Sample 24.

EXPERIMENTAL EXAMPLE 3

For Sample 23 and the coated honeybomb catalyst (Sample 24), denitration performance was inspected under the following conditions. The results are set forth in Table 3.

Temperature of gas: 450° C., 500° C., 550° C., 600° C.
SV: 23,000 hour$^{-1}$

Composition of gas

NO: 150 ppm
$NH_3$: 150 ppm
$O_2$: 5%
$CO_2$: 10%
$H_2O$: 9.1%
balance: $N_2$

It is apparent from the above-mentioned results that the catalyst (Sample 23) of the example regarding the present invention is more excellent in performance at temperatures of 500° C. and more, as compared with the conventional catalyst (Sample 24) of the comparative example.

TABLE 3

| Catalyst | 450° C. | 500° C. | 550° C. | 600° C. |
|---|---|---|---|---|
| Sample 23 | 63 | 70 | 73 | 77 |
| Sample 24 | 64 | 56 | 51 | 39 |

We claim:

1. In a method for denitrating a high-temperature exhaust gas by removing nitrogen oxides in the gas at a temperature of from about 500° to 700° C. in the presence of added ammonia and in the presence of a catalyst, the improvement which comprises said catalyst comprising at least one element selected from the group consisting of cerium and iron on a high silica zeolite in which the molar ratio of $SiO_2/Al_2O_3$ is 20 or more.

2. In a method for denitrating a high-temperature exhaust gas by removing nitrogen oxides in the gas at a temperature of from about 500° to 700° C. in the presence of added ammonia and in the presence of a catalyst, the improvement which comprises said catalyst comprising from 0.5 to 10% by weight of cerium in terms of $Ce_2O_3$ by weight of cerium in terms of $Ce_2O_3$ on a high silica zeolite in which the molar ratio of $SiO_2/Al_2O_3$ is 20 or more.

3. In a method for denitrating a high-temperature exhaust gas by removing nitrogen oxides in the gas at a temperature of from about 500° to 700° C. in the presence of added ammonia and in the presence of a catalyst, the improvement which comprises said catalyst comprising from 0.5 to 5 weight of iron in terms of $Fe_2O_3$ on a high silica zeolite in which the molar ratio of $SiO_2/Al_2O_3$ is 20 or more.

4. The method of claim 1 wherein the catalyst is obtained by impregnating a high silica type zeolite having a molar ratio of $SiO_2/Al_2O_3$ or 20 or more with an aqueous solution of ferric nitrate.

5. The method of claim 2 wherein the catalyst is obtained by impregnating a high silica type zeolite having a molar ratio of $SiO_2/Al_2O_3$ of 20 or more with an aqueous solution of cerium nitrate.

6. The method of claim 3 wherein the catalyst is obtained by impregnating a high silica type zeolite having a molar ratio of $SiO_2/Al_2O_3$ of 20 or more with an aqueous solution of ferric nitrate.

7. The method of claim 6 wherein the zeolite is ZSM-5.

8. The method of claim 2 wherein the zeolite is ZSM-5.

9. The method of claim 3 wherein the zeolite is ZSM-5.

* * * * *

UNITED STATES PATENT AND TRADEMARK OFFICE
CERTIFICATE OF CORRECTION

PATENT NO. : 5,271,913

DATED : December 21, 1993

INVENTOR(S) : Kouzo Iida, et al

It is certified that error appears in the above-indentified patent and that said Letters Patent is hereby corrected as shown below:

On the title page: Item [75]: Inventors:(first inventor should read as follows: —Kouzo Iida—.

Signed and Sealed this

Thirty-first Day of May, 1994

*Attest:*

BRUCE LEHMAN

*Attesting Officer*   *Commissioner of Patents and Trademarks*